United States Patent
Wada et al.

(10) Patent No.: US 10,947,112 B2
(45) Date of Patent: Mar. 16, 2021

(54) METHOD OF MANUFACTURING SEMICONDUCTOR QUANTUM DOT AND SEMICONDUCTOR QUANTUM DOT

(71) Applicant: FUJIFILM Corporation, Tokyo (JP)

(72) Inventors: Kenji Wada, Kanagawa (JP); Yuji Yoshida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 16/137,504

(22) Filed: Sep. 20, 2018

(65) Prior Publication Data

US 2019/0027562 A1 Jan. 24, 2019

Related U.S. Application Data

(63) Continuation of application No. PCT/JP2017/011037, filed on Mar. 17, 2017.

(30) Foreign Application Priority Data

Mar. 28, 2016 (JP) .............................. JP2016-063417

(51) Int. Cl.

| | |
|---|---|
| *B82Y 20/00* | (2011.01) |
| *B82Y 40/00* | (2011.01) |
| *C09K 11/70* | (2006.01) |
| *B82Y 30/00* | (2011.01) |
| *C09K 11/66* | (2006.01) |
| *C09K 11/74* | (2006.01) |
| *C09K 11/08* | (2006.01) |
| *C09K 11/62* | (2006.01) |
| *C09K 11/88* | (2006.01) |
| *B82Y 15/00* | (2011.01) |

(52) U.S. Cl.
CPC .............. *B82Y 20/00* (2013.01); *B82Y 30/00* (2013.01); *B82Y 40/00* (2013.01); *C09K 11/08* (2013.01); *C09K 11/62* (2013.01); *C09K 11/66* (2013.01); *C09K 11/70* (2013.01); *C09K 11/703* (2013.01); *C09K 11/74* (2013.01); *C09K 11/88* (2013.01); *B82Y 15/00* (2013.01); *C09K 11/0883* (2013.01)

(58) Field of Classification Search
CPC ..... C09K 11/0883; C09K 11/08; C09K 11/66; C09K 11/62; C09K 11/70; C09K 11/703; C09K 11/74; C09K 11/88; B82Y 30/00; B82Y 40/00; B82Y 20/00
See application file for complete search history.

(56) References Cited

U.S. PATENT DOCUMENTS

2010/0163798 A1 7/2010 Ryowa et al.

FOREIGN PATENT DOCUMENTS

| | | | |
|---|---|---|---|
| JP | 2007173755 | | 7/2007 |
| JP | 2010106119 | | 5/2010 |
| JP | 2010155872 | | 7/2010 |
| JP | 2012087220 | | 5/2012 |
| WO | WO 2017/019789 | * | 2/2017 |

OTHER PUBLICATIONS

"International Preliminary Report on Patentability (Form PCT/IPEA/409) of PCT/JP2017/011037," completed on Mar. 2, 2017, with English translation thereof, pp. 1-15.
"International Search Report (Form PCT/ISA/210) of PCT/JP2017/011037," dated Jun. 27, 2017, with English translation thereof, pp. 1-5.
Sungwoo Kim et al., "Highly Luminescent InP/GaP/ZnS Nanocrystals and Their Application to White Light-Emitting Diodes," American Chemical Society, 2012, pp. 3804-3809.

* cited by examiner

*Primary Examiner* — C Melissa Koslow
(74) *Attorney, Agent, or Firm* — JCIPRNET

(57) ABSTRACT

There is provided a method of manufacturing a semiconductor quantum dot including the following steps (A1) and (B1):
  a step (A1) of causing a nanoparticle including a specific compound semiconductor and a salt of a specific metal a1 to react with each other to introduce the metal a1 into a surface layer of the nanoparticle; and
  a step (B1) of causing the nanoparticle in which the metal a1 is introduced into the surface layer and a salt of a specific metal b1 to react with each other to introduce the metal b1 into the surface layer of the nanoparticle.
There is provided a semiconductor quantum dot having a structure in which a specific metal a1 and/or a specific metal b1 is introduced into a surface layer of a nanoparticle including a specific compound semiconductor.

14 Claims, No Drawings

METHOD OF MANUFACTURING SEMICONDUCTOR QUANTUM DOT AND SEMICONDUCTOR QUANTUM DOT

CROSS-REFERENCE TO RELATED APPLICATIONS

This application is a Continuation of PCT International Application No. PCT/JP2017/011037 filed on Mar. 17, 2017, which claims priority under 35 U.S.C. § 119 (a) to Japanese Patent Application No. 2016-063417 filed on Mar. 28, 2016. The above applications are hereby expressly incorporated by reference, in its entirety, into the present application.

BACKGROUND OF THE INVENTION

1. Field of the Invention

The present invention relates to a method of manufacturing a semiconductor quantum dot and a semiconductor quantum dot.

2. Description of the Related Art

A semiconductor quantum dot (hereinafter, simply referred to as a "quantum dot") is a nanoscale semiconductor crystal (several nanometers to several tens of nanometers) and exhibits featured light absorption and light emission characteristics based on a quantum size effect. The application range expected for the quantum dot is wide, and for example, application research on a display, lighting, living body imaging, solar cells, and the like has been conducted based on strong light emission characteristics corresponding to a particle diameter thereof. Application research as quantum dot lasers, single electron transistors, and the like which realize high luminance and low power consumption by utilizing the unique electronic characteristics of the quantum dot has been conducted.

Currently, a mainstream of the quantum dot is a cadmium-based quantum dot using nanocrystals (nanocrystals such as CdSe and CdS) having cadmium as a cation. However, there is concern about the toxicity of cadmium, and thus the need for a non-cadmium-based quantum dot is increasing. A quantum dot using a nanocrystal (nanocrystals such as PbS, PbSe, InN, InAs, InSb, InP, and the like) having lead, indium, or the like as a cation has been known as a non-cadmium-based quantum dot. However, the non-cadmium-based quantum dots still have many problems in terms of performance, and a quantum dot that is on the market and is practically used is limited to a cadmium-based quantum dot at present.

According to this circumstance, technological development has been performed for enhancing the performance of a non-cadmium-based quantum dot. For example, J. Am. Chem. Soc. 2012, vol. 134, p. 3804 to 3809 discloses that a nanocrystal having a structure in which a GaP/ZnS multiple shell layer is provided around an In(Zn)P quantum dot core is synthesized to achieve a high quantum yield. In this synthesis method, indium acetate, zinc acetate, palmitic acid, and 1-octadecene are mixed and heated in a flask, the flask was evacuated for deaeration, then tris(trimethylsilyl) phosphine is added to the flask heated to 300° C., and reaction was performed at 230° C. for two hours, so as to synthesize an In(Zn)P quantum dot core. In preparation of this In(Zn)P quantum dot core, zinc acetate is formulated as described above, this zinc is doped in a crystal lattice, and an In(Zn)P alloy is formed, so as to improve optical characteristics. In the technique disclosed in J. Am. Chem. Soc. 2012, vol. 134, p. 3804 to 3809, a GaP shell layer and a ZnS shell layer are sequentially formed on a surface layer of the In(Zn)P quantum dot core so as to obtain a quantum dot including an In(Zn)P/GaP/ZnS nanocrystal.

SUMMARY OF THE INVENTION

An object of the present invention is to provide a method for manufacturing a quantum dot which can obtain a non-cadmium-based quantum dot which has an excellent quantum yield, has a narrow half-width of an emission peak, and exhibits sharp light emission characteristics. Another object of the present invention is to provide a non-cadmium-based quantum dot which has an excellent quantum yield, has a narrow half-width of an emission peak, and exhibits sharp light emission characteristics.

In view of the above objects, the present inventors have diligently conducted research to find that, in the manufacturing of quantum dots, a core nanoparticle (nanocrystal) is formed in the absence of a metal salt for doping, and then a specific metal cation different from the metal cation forming the core nanoparticle is introduced into the surface layer of the core nanoparticle, such that a quantum dot which has an excellent quantum yield, has a narrow half-width of an emission peak, and exhibits sharp light emission characteristics may be obtained. Based on these findings, further research has been performed so as to complete the present invention.

That is, the objects of the present invention are achieved by the following means.

[1]
A method of manufacturing a semiconductor quantum dot comprising the following steps (A1) and (B1): a step (A1) of causing a nanoparticle including at least one compound semiconductor selected from the group consisting of PbS, PbSe, InN, InAs, InSb, and InP and a salt of at least one metal a1 selected from a metal group [a] below to react with each other to introduce the metal a1 into a surface layer of the nanoparticle; and a step (B1) of causing the nanoparticle in which the metal a1 is introduced into the surface layer and a salt of at least one metal b1 selected from a metal group [b] below to react with each other to introduce the metal b1 into the surface layer of the nanoparticle, the metal group [a]:
Ca, Sc, Ti, V, Cr, Mn, Fe, Co, Ni, Cu, and Zn, and
the metal group [b]:
Ga and Ge.

[2]
The method of manufacturing a semiconductor quantum dot according to [1], in which an average particle diameter of nanoparticles including at least one compound semiconductor selected from the group consisting of PbS, PbSe, InN, InAs, InSb, and InP used in the step (A1) is 1 to 10 nm.

[3]
The method of manufacturing a semiconductor quantum dot according to [1] or [2], in which a reaction temperature in the step (A1) is 100° C. or higher.

[4]
The method of manufacturing a semiconductor quantum dot according to any one of [1] to [3], in which a reaction temperature in the step (B1) is 100° C. or higher.

[5]

The method of manufacturing a semiconductor quantum dot according to any one of [1] to [4], in which the reaction in the steps (A1) and (B1) is performed in a noncoordination solvent.

[6]

The method of manufacturing a semiconductor quantum dot according to [5], in which a moisture content of the solvent is 10 ppm or less.

[7]

The method of manufacturing a semiconductor quantum dot according to any one of [1] to [6], in which each reaction in the steps (A1) and (B1) is performed in the presence of a coordination compound.

[8]

The method of manufacturing a semiconductor quantum dot according to any one of [1] to [7], in which the metal a1 is Zn, and the metal b1 is Ga.

[9]

The method of manufacturing a semiconductor quantum dot according to any one of [1] to [8], in which the nanoparticle used in the step (A1) is InP.

[10]

The method of manufacturing a semiconductor quantum dot according to any one of [1] to [9], further comprising: a step of forming a shell layer on a surface layer of the nanoparticle which is obtained in the step (B1) and in which the metal b1 is introduced into the surface layer.

[11]

The method of manufacturing a semiconductor quantum dot according to [10], in which the shell layer is ZnS, ZnO, ZnSe, $ZnSe_xS_{1-x}$, ZnTe, or CuO, where, $0<X<1$.

[12]

A semiconductor quantum dot having a structure in which at least one metal a1 selected from a metal group [a] below and/or at least one metal b1 selected from a metal group [b] below is introduced into a surface layer of a nanoparticle including at least one compound semiconductor selected from the group consisting of PbS, PbSe, InN, InAs, InSb, and InP, the metal group [a]:

Ca, Sc, Ti, V, Cr, Mn, Fe, Co, Ni, Cu, and Zn, and the metal group [b]:

Ga and Ge.

[13]

The semiconductor quantum dot according to [12], comprising: a shell layer on the surface layer into which the metal a1 and/or the metal b1 is introduced.

[14]

The semiconductor quantum dot according to [13], in which the shell layer is ZnS, ZnO, ZnSe, $ZnSe_xS_{1-x}$, ZnTe, or CuO, where, $0<X<1$ is satisfied.

In the present specification, a numerical range indicated by using "to" means a range including numerical values described before and after "to" as a lower limit value and an upper limit value.

In the present specification, the expression "nanoparticle" means a particle having an average particle diameter of less than 100 nm, preferably 50 nm or less, more preferably 30 nm or less, further preferably 20 nm or less, and particularly preferably 10 nm or less. The average particle diameter of the "nanoparticle" is generally 1 nm or more and preferably 2 nm or more.

According to the method of manufacturing a quantum dot of the present invention, it is possible to obtain a non-cadmium-based quantum dot which has an excellent quantum yield, has a narrow half-width of an emission peak, and exhibits sharp light emission characteristics. The quantum dot of the present invention does not contain cadmium, has excellent quantum yield, has a narrow half-width of an emission peak, and exhibits sharp light emission characteristics.

The above and other characteristics and advantages of the present invention are more clearly provided from the following descriptions.

DESCRIPTION OF THE PREFERRED EMBODIMENTS

The preferable embodiment of the present invention is provided below, but the present invention is not limited to these embodiments.

[Method of Manufacturing Quantum Dot]

A method (hereinafter, simply referred to as a "manufacturing method of the present invention") of manufacturing a quantum dot of the present invention includes steps (A1) and (A2).

(A1) a step of causing a nanoparticle including at least one compound semiconductor selected from the group consisting of PbS, PbSe, InN, InAs, InSb, and InP and a salt of at least one metal a1 selected from a metal group [a] below to react with each other to introduce the metal a1 into a surface layer of the nanoparticle; and (B1) a step of causing the nanoparticle in which the metal a1 is introduced into the surface layer and a salt of at least one metal b1 selected from a metal group [b] below to react with each other to introduce the metal b1 into the surface layer of the nanoparticle.

The metal group [a]:

Ca, Sc, Ti, V, Cr, Mn, Fe, Co, Ni, Cu, and Zn.

The metal group [b]:

Ga and Ge.

Respective steps of the manufacturing method of the present invention are sequentially described.

<Step (A1)>

In the step (A1), a nanoparticle (nanocrystal, hereinafter, also referred to as a "nanoparticle A") including at least one compound semiconductor selected from the group consisting of PbS, PbSe, InN, InAs, InSb, and InP and the salt of at least one metal a1 selected from the metal group [a] are caused to react with each other, and the metal a1 is introduced into a surface layer of the nanoparticle A. The nanoparticle A is preferably a nanoparticle (that is, a nanoparticle including one kind of a compound semiconductor) formed of PbS, PbSe, InN, InAs, InSb, or InP.

The nanoparticle A may be prepared by a general method. That is, the nanoparticle A can be obtained by using metal salt (which is a supply source of a metal cation in a nanocrystal, a salt of Pb and/or a salt of In) corresponding to each compound semiconductor and an anion precursor (which is a supply source of an anion component in a nanocrystal, generally, a sulfur-containing compound, a selenium-containing compound, a nitrogen-containing compound, an arsenic-containing compound, an antimony-containing compound, and/or a phosphorus-containing compound are used) corresponding to each compound semiconductor as raw materials, and causing the both to react with each other (hereinafter, this reaction is called a "reaction (I)").

Examples of the metal salt include an organic acid salt of each metal (for example, monocarboxylic acid salt such as acetic acid salt and propionic acid, hydroxycarboxylic acid salt such as glycolic acid salt and lactic acid salt, dicarboxylic acid salt such as succinic acid salt and oxalic acid salt, polycarboxylic acid salt such as citric acid, aliphatic or aromatic sulfonic acid salt such as methanesulfic acid salt and toluenesulfic acid salt, carbonic acid salt, bicarbonate, sulfamic acid salt, metal alkoxide, and metal acetylacetonate), and an inorganic acid salt of each metal (for example, nitric acid salt, sulfonic acid salt, hydriodic acid salt, hydrochloric acid salt, hydrobromic acid salt, hydrofluoric acid salt, peracetic acid salt, phosphoric acid salt, and hydrocyanic acid salt).

In the preparation of the nanoparticle of PbS and the nanoparticle of PbSe, examples of the metal salt used include an inorganic acid salt of Pb such as lead nitrate, lead sulfate, lead carbonate, lead phosphate, lead perchlorate, lead cyanide, lead fluoride, lead chloride, lead bromide, and lead iodide; and an organic acid salt of Pb such as lead acetate, lead oxalate, lead tartrate, lead alkoxide (for example, lead isopropoxide, lead butoxide, lead ethoxide, and lead methoxyethoxide), lead sulfamate, and acetylacetone lead. These metal salts may be used singly or may be used in a mixture.

In the preparation of the nanoparticle of InN, the nanoparticle of InAs, the nanoparticle of InSb, and the nanoparticle of InP, examples of the metal salt used include an inorganic acid salt of In such as indium nitrate, indium sulfate, indium carbonate, indium phosphate, indium perchlorate, indium cyanide, indium fluoride, indium chloride, indium bromide, and indium iodide; and an organic acid salt of In such as indium acetate, indium oxalate, indium tartrate, indium alkoxide (for example, indium isopropoxide, indium butoxide, indium ethoxide, and indium methoxyethoxide), indium sulfamate, and acetylacetone indium. These metal salts may be used singly or may be used in a mixture.

Examples of the sulfur-containing compound that can be used as the anion precursor include a sulfur compound having an alkylsilyl group such as bis(trimethylsilyl) sulfide, bis(triethylsilyl) sulfide, and bis(tripropylsilyl) sulfide. A sulfur atom of a single substance can also be used as the anion precursor.

Examples of the selenium-containing compound that can be used as the anion precursor include bis(trimethylsilyl) selenide, (tri-n-octylphosphine) selenide, and (tri-n-butylphosphine) selenide.

Examples of the nitrogen-containing compound that can be used as the anion precursor include ammonia, ammonium nitrosophenyl hydroxylamine, ammonium fluoride, ammonium chloride, ammonium bromide, and ammonium iodide.

Examples of the arsenic-containing compound that can be used as the anion precursor include trimethylarsine, triphenyl arsine, triphenoxyarsine, tris(trimethylsilyl) arsine, dimethyl arsine chloride, and dimethylarsine.

Examples of the antimony-containing compound that can be used as the anion precursor include tris(trimethylsilyl) antimony and triphenylantimony.

Examples of the phosphorus-containing compound that can be used as the anion precursor include tris(trimethylsilyl) phosphine, tris(triethylsilyl) phosphine, tris(tri-n-propylsilyl) phosphine, tris(triisopropylsilyl) phosphine, tris(dimethylphenylsilyl) phosphine, tris(dimethylbenzylsilyl) phosphine, bis(trimethylsilyl) phosphine, tris(diethylamino) phosphine, and tris(dimethylamino) phosphine.

In the reaction (I), well-known reaction conditions can be deformed according to the purpose, if necessary, to be appropriately applied. For example, a method in which, in an inert atmosphere, a raw material, a solvent, and, if necessary, a coordination compound (dispersing agent) are placed in a reaction vessel and sealed, and are heated by using a heater or the like, and the reaction is performed under high temperature and high pressure (solvothermal method) can be performed. A method in which a reaction vessel including a solvent and, if necessary, a coordination compound is heated by using an oil bath or the like while an inert gas is ventilated, and a raw material is injected by using a syringe such that the reaction is performed (hot soap method) is known. These methods are disclosed, for example, in JP2006-265022A, JP2008-44827A, WO2007/138851A, JP2009-19067A, JP2009-40633A, JP2008-279591A, JP2010-106119A, and JP2010-138367A, and can be referred to in the preparation of nanoparticles used in the present invention.

At the reaction starting point of the reaction (I), the content of the metal salt in the reaction liquid is preferably 0.05 to 5 mass % and more preferably 0.1 to 2 mass %. At the reaction starting point of the reaction (I), a content of the anion precursor in a reaction liquid is preferably 0.05 to 5 mass % and more preferably 0.1 to 2 mass %.

According to the present invention, respective compound semiconductors of PbS, PbSe, InN, InAs, InSb, and InP do not have any element other than the elements indicated in each composition formula. For example, with respect to the synthesis of an InP nanoparticle, it is known that optical characteristics are improved by doping Zn in an InP crystal lattice and forming an In(Zn)P alloy. However, according to the present invention, it is preferable that the InP nanoparticles are not doped with impurities such as Zn in the particle formation step. In this manner, the performance of the quantum dot obtained by the manufacturing method of the present invention can be improved.

In the present specification, the expression "respective compound semiconductors of PbS, PbSe, InN, InAs, InSb, and InP do not have any element other than the elements indicated in each composition formula" means that, in a case where the total number of atoms of the elements indicated in each composition formula in the respective compound semiconductor crystals is 100 (for example, in a case where, in the InP nanoparticle, the sum of the number of In's and the number of P's in the InP nanoparticle is 100), the total number of atoms of the elements other than the elements indicated in the each composition formula (for example, in the case of the InP nanoparticle, the total number of atoms other than In and P contained in this InP nanoparticle) is 0 to 5, preferably 0 to 3, more preferably 0 to 1, and particularly preferably 0.

The solvent used for the reaction (I) is not particularly limited, and is usually an organic solvent. In view of the dispersibility of the formed particles or the like, it is preferable to contain a nonpolar solvent. The nonpolar solvent may be included in the dispersion liquid singly, or two or more kinds thereof may be included. It is preferable to use a solvent selected from alkane, alkene, benzene, and toluene as the nonpolar solvent.

The nonpolar solvent preferably has a boiling point of 170° C. or higher. Preferable specific examples of the nonpolar solvent include aliphatic saturated hydrocarbon such as n-decane, n-dodecane, n-hexadecane, and n-octadecane, aliphatic unsaturated hydrocarbon such as 1-undecene, 1-dodecene, 1-hexadecene, and 1-octadecene, and trioctylphosphine. Among these, the nonpolar solvent is preferably an aliphatic unsaturated hydrocarbon having 12 or more carbon atoms and more preferably 1-octadecene. In a case where an organic solvent having a boiling point of 170° C. or higher is used, the particles hardly aggregate during particle formation, and the solution dispersibility of the nanoparticles becomes more satisfactory.

The proportion of the nonpolar solvent in the solvent is preferably 80 volume % or more, more preferably 90 volume % or more, even more preferably 95 volume % or more, and still even more preferably 99 volume % or more, and it is particularly preferable that all of the solvents are nonpolar solvents.

According to the present invention, in addition to the solvent or instead of the solvent, one or more kinds of the following solvents can be used.

Examples thereof include an amide compound such as N-methyl-2-pyrrolidone (NMP), N,N-dimethylacetamide (DMAC), and N,N-dimethylformamide, a urea compound such as N,N-dimethylethylene urea, N,N-dimethyl propylene urea, and tetramethylurea, a lactone compound such as γ-butyrolactone and γ-caprolactone, a carbonate compound such as propylene carbonate, a ketone compound such as methyl ethyl ketone, methyl isobutyl ketone, and cyclohexanone, an ester compound such as ethyl acetate, n-butyl acetate, butyl cellosolve acetate, butyl carbitol acetate, ethyl cellosolve acetate, and ethyl carbitol acetate, an ether compound such as diglyme, triglyme, tetraglyme, diethylene glycol, diethylene glycol ethyl methyl ether, diethylene glycol diethyl ether, diethylene glycol monomethyl ether, triethylene glycol butyl methyl ether, triethylene glycol monoethyl ether, triethylene glycol monomethyl ether, and diphenyl ether, and a sulfone compound such as sulfolane.

The solvent used in the reaction (I) is preferably a noncoordination solvent. The "noncoordination solvent" in the present specification is a solvent that can coordinate to a metal atom. More specifically, the noncoordination solvent means a solvent not having a hetero atom selected from an oxygen atom, a sulfur atom, a nitrogen atom, and a phosphorus atom in the molecule. In a case where the noncoordination solvent is used, the particle formation reaction can be accelerated such that a nanoparticle having the more even composition and the more even size distribution can be synthesized.

In view of preventing hydrolysis and the like of the anion precursor, the moisture content of the solvent used in the reaction (I) is preferably 10 ppm or less and usually 0 to 8 ppm in terms of mass. Particularly, in a case where a compound having an alkylsilyl group is used as an anion precursor, it is preferable that the moisture content is extremely minimized.

In the reaction (I), the content of the solvent in the reaction liquid is preferably 90 to 99.8 mass % and more preferably 95 to 99.5 mass %.

In the reaction (I), a compound that can coordinate to the nanoparticle (hereinafter referred to as a "coordination compound") is preferably added. By performing the particle formation reaction in the presence of the coordination compound, the coordination compound coordinates to the surface layer of the formed particle to effectively suppress the aggregation of the particles, such that the dispersion state of the nanoparticles can be stabilized.

In view of improving the dispersibility of the particles, the coordination compound preferably has a hydrocarbon chain having 6 or more carbon atoms and more preferably has a hydrocarbon chain having 10 or more carbon atoms. Specific examples of the coordination compound include decanoic acid, lauric acid, myristic acid, palmitic acid, stearic acid, behenic acid, oleic acid, erucic acid, oleylamine, dodecylamine, dodecanethiol, 1,2-hexadecanethiol, trioctylphosphine oxide, and cetrimonium bromide.

In a case where the reaction (I) is performed in the co-presence of the coordination compound, the content of the coordination compound in the reaction liquid at the reaction starting point is preferably 0.1 to 5 mass %, more preferably 0.3 to 5 mass %, even more preferably 0.5 to 5 mass %, and particularly preferably 1 to 3 mass %.

In view of the reaction rate, the reaction temperature of the reaction (I) is generally 100° C. or higher, preferably 150° C. or higher, more preferably 200° C. or higher, and even more preferably 250° C. or higher. In view of the solvent boiling point and the operation safety, the reaction temperature of the reaction (I) is generally 400° C. or lower and preferably 350° C. or lower.

The reaction time of the reaction (I) is appropriately adjusted according to the desired particle diameter, and is generally 0.1 to 180 minutes and preferably 0.1 to 60 minutes.

The average particle diameter of the nanoparticles A used as a raw material in the step (A1) is preferably 1 to 10 nm and more preferably 2 to 10 nm.

According to the present invention, the average particle diameter of the nanoparticles is a value measured by a transmission electron microscope. More specifically, areas occupied by particles from projected areas are obtained by an image processing device with respect to 100 particles randomly selected by a transmission electron microscope, the sum of the areas occupied by 100 particles is divided by the number (100) of the selected particles, and the average particle diameter can be calculated as an average value of circle diameters (average circle-equivalent diameter) corresponding to the obtained value. The average particle diameter does not include the particle diameters of secondary particles formed by aggregation of primary particles.

In the step (A1), the nanoparticle A and a salt of at least one metal a1 selected from the metal group [a] are caused to react with each other (this reaction is hereinafter called a "reaction (II)"). The metal a1 is one or more kinds of metal selected from the metal group [a] and is preferably one kind of metal. The metal a1 can be introduced into the surface layer of the nanoparticle by the reaction (II). The reaction (II) may be performed in the presence of the above anion precursor or in the absence of an anion precursor. Also, metal salt used in the reaction (I) may be co-present. It is not clearly understood how the metal a1 is introduced by the reaction (II), but it is assumed that at least one of the following reactions proceeds at least.

That is, it is considered that, in a case where the reaction (II) is performed in the presence of an anion precursor, a crystal structure including cations and anions of the metal a1 grows on the surface layer of the nanoparticles, and the metal a1 is introduced into the surface layer of the nanoparticles, or independently from this reaction, due to cation exchange between Pb or In and the metal a1 which are present on the surface layer of the nanoparticle or doping of the metal a1 in the crystal lattice of the surface layer of nanoparticle, the metal a1 is introduced into the surface layer of the nanoparticle.

It is considered that, in a case where the reaction (II) is performed in the absence of an anion precursor, due to cation exchange between Pb or In and the metal a1 which are present on the surface layer of the nanoparticle or doping of the metal a1 in the crystal lattice of the surface layer of nanoparticle, the metal a1 is introduced into the surface layer of the nanoparticle.

The reaction (II) may be performed by mixing the reaction liquid of the reaction (I) and the salt of the metal a1 after the reaction (I). After the completion of the reaction (I), the obtained nanoparticle may be redispersed in another solvent, and this redispersion liquid and the salt of the metal a1 are mixed so as to perform the reaction (II).

In the reaction (II), the solvent species and the content of the solvent in the reaction liquid which can be used for the reaction are respectively the same as those which can be used for the reaction (I), and preferable aspects thereof are also the same.

In a case where the reaction (II) is performed, a coordination compound (dispersing agent) which can be added in the reaction (I) may be contained in the reaction liquid. In this case, the content of the coordination compound in the reaction liquid in the reaction (II) is preferably 0.1 to 5 mass %, more preferably 0.3 to 5 mass %, even more preferably 0.5 to 5 mass %, and particularly preferably 1 to 3 mass %.

In the reaction (II), examples of the salt of the metal a1 include an organic acid salt of the metal a1 (for example, monocarboxylic acid salt such as acetic acid salt and propionic acid, hydroxycarboxylic acid salt such as glycolic acid salt and lactic acid salt, dicarboxylic acid salt such as succinic acid salt and oxalic acid salt, polycarboxylic acid salt such as citric acid, an aliphatic or aromatic sulfonic acid salt such as methanesulfonic acid salt and toluenesulfonic acid salt, carbonic acid salt, bicarbonate, sulfamic acid salt, metal alkoxide, and metal acetylacetonate), and an inorganic acid salt of the metal a1 (for example, nitric acid salt, sulfuric acid salt, hydriodic acid salt, hydrochloric acid salt, hydrobromic acid salt, hydrofluoric acid salt, perchloric acid salt, phosphoric acid salt, and hydrocyanic acid salt).

In the case where the metal a1 is Ca, examples of the organic acid salt of Ca include calcium acetate, calcium propionate, calcium stearate, calcium glycolate, calcium oxalate, aliphatic or aromatic sulfonate such as calcium methanesulfonate and calcium toluenesulfonate, calcium carbonate, calcium hydrogen carbonate, calcium sulfamate, calcium ethoxide, and acetylacetone calcium. Examples of the inorganic acid salt of Ca include calcium sulfate, calcium chloride, calcium bromide, and calcium phosphate.

In the case where the metal a1 is Sc, examples of the organic acid salt of Sc include scandium acetate, scandium stearate, scandium methanesulfonate, cascandium carbonate, scandium sulfamate, scandium ethoxide, and acetylacetone scandium. Examples of the inorganic acid salts of Sc include scandium nitrate, scandium chloride, scandium bromide, and scandium phosphate.

In the case where the metal a1 is Ti, examples of the organic acid salt of Ti include titanium acetate, titanium stearate, titanium glycolate, titanium oxalate, aliphatic or aromatic sulfonate such as titanium methanesulfonate and titanium toluenesulfonate, and titanium carbonate, titanium isopropoxide, titanium t-butoxide, and acetylacetone titanium. Examples of the inorganic acid salt of Ti include titanium chloride.

In the case where the metal a1 is V, examples of the organic acid salt of V include vanadium acetate, vanadium stearate, vanadium carbonate, triisopropoxy vanadium oxide, and acetylacetonato vanadium. Examples of the inorganic acid salt of V include vanadium oxide sulfate, vanadium chloride, vanadium bromide, and vanadium fluoride.

In the case where the metal a1 is Cr, examples of the organic acid salt of Cr include chromium acetate, chromium stearate, and chromium acetylacetonate. Examples of the inorganic acid salt of Cr include chromium nitrate, chromium chloride, and chromium phosphate.

In the case where the metal a1 is Mn, examples of the organic acid salt of Mn include manganese acetate, manganese stearate, manganese 2-ethylhexanoate, manganese oxalate, manganese carbonate, manganese formate, acetylacetone manganese, tris(2,2,6,6-tetramethyl-3,5-heptanedionato) manganese, bis(trifluoromethanesulfonyl) imide manganese, and N,N'-ethylenebis(salicylideneiminato) manganese. Examples of the inorganic acid salt of Mn include manganese nitrate, manganese sulfate, manganese chloride, and manganese phosphate.

In the case where the metal a1 is Fe, examples of the organic acid salt of Fe include iron acetate, iron stearate, iron 2-ethylhexanoate, iron oxalate, iron citrate, iron methanesulfonate, diethyldithiocarbamate iron, iron methoxide, acetylacetone iron, ferrocene, and N,N'-ethylenebis(salicylideneiminato) iron. Examples of the inorganic acid salt of Fe include iron nitrate, iron sulfate, iron chloride, iron bromide, iron iodide, and iron phosphate.

In the case where the metal a1 is Co, examples of the organic acid salt of Co include cobalt acetate, cobalt stearate, cobalt oxalate, cobalt citrate, cobalt carbonate, cobalt sulfamate, tris(2,2,6,6-tetramethyl-3,5-heptanedionato) cobalt, acetylacetone cobalt, and N,N'-ethylenebis(salicylideneiminato) cobalt. Examples of the inorganic acid salt of Co include cobalt nitrate, cobalt sulfate, cobalt chloride, cobalt bromide, cobalt iodide, and cobalt phosphate.

In the case where the metal a1 is Ni, examples of the organic acid salt of Ni include nickel acetate, nickel stearate, nickel 2-ethylhexanoate, nickel lactate, aliphatic or aromatic sulfonate such as nickel trifluoromethanesulfonate and nickel toluenesulfonate, nickel carbonate, nickel 2-methoxyethoxide, nickel diethyldithiocarbamate, acetylacetone nickel, trifluoroacetylacetonato nickel, [1,2-bis(diphenylphosphino) ethane] nickel dichloride, and N,N'-ethylenebis(salicylideneiminato) nickel. Examples of the inorganic acid salt of Ni include nickel nitrate, nickel sulfate, nickel chloride, nickel bromide, and nickel iodide.

In the case where the metal a1 is Cu, examples of the organic acid salt of Cu include copper acetate, copper stearate, copper 2-ethylhexanoate, copper citrate, copper oxalate, aliphatic or aromatic sulfonate such as copper trifluoromethanesulfonate and copper toluene sulfonate, copper carbonate, copper formate, copper ethoxide, copper diethyl dithiocarbamate, acetyl acetone copper, copper trifluoroacetylacetonate, bis(1,3-propanediamine) copper dichloride, bis(trifluoromethanesulfonyl) imide copper, and N,N'-ethylenebis(salicylideneiminato) copper. Examples of the inorganic acid salt of Cu include copper nitrate, copper sulfate, copper chloride, copper bromide, and copper iodide.

In the case where the metal a1 is Zn, examples of the organic acid salt of Zn include zinc acetate, zinc propionate, zinc stearate, zinc laurate, zinc 2-ethylhexanoate, copper citrate, copper oxalate, zinc trifluoroacetate, zinc p-t-butylbenzoate, aliphatic or aromatic sulfonate such as zinc trifluoromethanesulfonate and zinc toluenesulfonate, zinc carbonate, zinc formate, zinc tert-butoxide, zinc diethyl dithiocarbamate, acetylacetone zinc, bis(2,2,6,6-tetramethyl-3,5-heptanedionato) zinc, zinc trifluoroacetylacetonate, dichloro(N,N,N',N'-tetramethylethane-1,2-diamine) zinc, bis(trifluoromethanesulfonyl) imide zinc, and N,N'-ethylenebis(salicylideneiminato) zinc. Examples of the inorganic acid salt of Zn include zinc nitrate, zinc sulfate, zinc chloride, zinc bromide, zinc iodide, and zinc phosphate.

At the starting point of the reaction (II), the content of the salt of the metal a1 in the reaction liquid is preferably 0.1 to 5 mass %, more preferably 0.2 to 4 mass %, and even more preferably 0.5 to 2 mass %.

At the starting point of the reaction (II), the content of the nanoparticle selected from the PbS particle, the PbSe particle, the InN particle, the InAs particle, the InSb particle, and the InP particle in the reaction liquid is preferably 0.05 to 5 mass %, more preferably 0.05 to 2 mass %, and even more preferably 0.1 to 2 mass %.

In view of the reaction rate, the reaction temperature of the reaction (II) is generally 100° C. or higher, preferably 150° C. or higher, more preferably 200° C. or higher, and even more preferably 250° C. or higher. In view of the solvent boiling point and operation safety, the reaction temperature of the reaction (II) is generally 400° C. or lower and preferably 350° C. or lower.

The reaction time of the reaction (II) is appropriately adjusted according to the purpose, and is generally 1 to 240 minutes and preferably 10 to 180 minutes.

In the reaction (II), the nanoparticles to be used are preferably InN or InP nanoparticles and more preferably InP nanoparticles. The metal a1 is preferably Cu or Zn and more preferably Zn.

<Step (B1)>

In the step (B1), the nanoparticle which is obtained in the step (A1) and in which the metal a1 is introduced into the surface layer and a salt of at least one metal b1 selected from the metal group [b] are caused to react with each other (this reaction is hereinafter called a "reaction (III)"). The metal b1 is one or two metals selected from the metal group [b] and is preferably one kind of metal. By this reaction, the metal b1 can be introduced into the surface layer of the nanoparticle which is obtained in the step (A1) and in which the metal a1 introduced into the surface layer. The reaction (III) may be performed in the presence of the above anion precursor or in the absence of an anion precursor. It is not clearly understood how the metal b1 is introduced by the reaction (III), but it is assumed that at least one of the following reactions proceeds at least.

That is, it is considered that, in a case where the reaction (III) is performed in the presence of an anion precursor, a crystal layer or an amorphous layer including cations and anions of the metal b1 grows on the surface layer of the nanoparticles in which the metal a1 is introduced into the surface layer, and the metal b1 is introduced into the surface layer of the nanoparticles, or independently from this reaction, due to cation exchange between the metal a1 and the metal b1 which are present on the surface layer of the nanoparticle, the metal b1 is introduced into the surface layer of the nanoparticle.

It is considered that, in a case where the reaction (III) is performed in the absence of an anion precursor, due to cation exchange between the metal a1 and the metal b1 which are present on the surface layer of the nanoparticle, the metal b1 is introduced into the surface layer of the nanoparticle.

The reaction (III) may be performed by mixing the reaction liquid of the reaction (II) and the salt of the metal b1 after the reaction (II). After the completion of the reaction (II), the obtained nanoparticle in which the metal a1 introduced into the surface layer may be redispersed in another solvent, and this redispersion liquid and the salt of the metal b1 are mixed so as to perform the reaction (III).

In the reaction (III), the solvent species and the content of the solvent in the reaction liquid which can be used for the reaction are respectively the same as those which can be used for the reaction (I), and preferable aspects thereof are also the same.

In a case where the reaction (III) is performed, a coordination compound which can be added in the reaction (I) may be contained in the reaction liquid. In this case, the content of the coordination compound in the reaction liquid in the reaction (III) is preferably 0.1 to 5 mass %, more preferably 0.3 to 5 mass %, even more preferably 0.5 to 5 mass %, and particularly preferably 1 to 3 mass %.

In the reaction (III), examples of the salt of the metal b1 used include an organic acid salt of the metal b1 (for example, monocarboxylic acid salt such as acetic acid salt and propionic acid, hydroxycarboxylic acid salt such as glycolic acid salt and lactic acid salt, dicarboxylic acid salt such as succinic acid salt and oxalic acid salt, polycarboxylic acid salt such as citric acid, an aliphatic or aromatic sulfonic acid salt such as methanesulfonic acid salt and toluenesulfonic acid salt, carbonic acid salt, bicarbonate, sulfamic acid salt, metal alkoxide, and metal acetylacetonate), and an inorganic acid salt of the metal a1 (for example, nitric acid salt, sulfuric acid salt, hydriodic acid salt, hydrochloric acid salt, hydrobromic acid salt, hydrofluoric acid salt, perchloric acid salt, phosphoric acid salt, and hydrocyanic acid salt).

In the case where the metal b1 is Ga, examples of the organic acid salt of Ga include gallium acetate, gallium stearate, gallium 2-ethylhexanoate, aliphatic or aromatic sulfonate such as gallium trifluoromethanesulfonate and gallium toluenesulfonate, gallium gallium ethoxide, gallium isopropoxide, acetylacetone gallium, and trifluoroacetylacetonatogallium. Examples of the inorganic acid salt of Ga include gallium nitrate, gallium sulfate, gallium chloride, gallium bromide, gallium iodide, and gallium phosphate.

In the case where the metal a1 is Ge, examples of the organic acid salt of Ge include germanium acetate, germanium stearate, and germanium ethoxide. Examples of the inorganic acid salt of Ge include germanium nitrate and germanium chloride.

At the starting point of the reaction (III), the content of the salt of the metal b1 in the reaction liquid is preferably 0.1 to 5 mass %, more preferably 0.2 to 4 mass %, and even more preferably 0.5 to 2 mass %.

At the starting point of the reaction (III), the content of the nanoparticle in which the metal a1 is introduced into the surface layer in the reaction liquid is preferably 0.05 to 5 mass %, more preferably 0.05 to 2 mass %, and even more preferably 0.1 to 2 mass %.

The reaction temperature of the reaction (III) is generally 100° C. or higher, preferably 150° C. or higher and more preferably 200° C. or higher. The reaction temperature of the reaction (III) is generally 400° C. or lower and preferably 350° C. or lower.

The reaction time of the reaction (III) is appropriately adjusted according to the purpose, and is generally 1 to 240 minutes and preferably 10 to 180 minutes.

In the reaction (III), the metal b1 is preferably Ga or Ge and more preferably Ga.

<Other Steps>

The manufacturing method of the present invention may include a step of forming a shell layer on the surface layer of the nanoparticle which is obtained in the step (B1) and in which the metal b1 is introduced into the surface layer. As the corresponding shell layer, a shell layer that is generally employed as a shell layer of a quantum dot can be employed, and preferable examples thereof include shell layers formed of ZnS, ZnO, ZnSe, $ZnSe_XS_{1-X}$ (0<X<1), ZnTe, $In_2O_3$, or CuO.

The forming of the shell layer can be performed by a general method, and for example, those disclosed in JP2012-525467A, JP2015-529698A, JP2014-523634A, JP2015-127362A, JP4565152B, JP4344613B, U.S. Pat. No. 7,105,051B, U.S. Pat. No. 848,111A, and APPLIED PHYSICS LETTERS 97, 193104, [1] 2010, ACS Appl. Mater. Interfaces 2014, 6, p. 18,233 to 18,242 can be referred to.

For example, the shell layer of ZnS can be formed by adding Zn acetate, 1-dodecanethiol, and, if necessary, a coordination compound to the reaction liquid after completion of the reaction (III) and performing reaction at a temperature of 200° C. or more for several hours. Other shell layers can be formed by changing the raw materials used according to this method, depending on the purpose. Other shell layers can also be formed by a reaction under high temperature conditions using an organic metal such as dimethyldiethyl zinc as a supply source of Zn, a thermal decomposition reaction of zinc dialkyldithiocarbamate, or the like.

The shell layer is preferably ZnS, ZnO, ZnSe, or $ZnSe_XS_{1-X}$ and more preferably ZnS.

In an aspect in which a shell layer is not provided, the average particle diameter of the quantum dot obtained by the manufacturing method of the present invention is preferably 1 to 10 nm and more preferably 1 to 6 nm. In a case where the quantum dot obtained in the manufacturing method of the present invention has a shell layer, the average particle diameter of the quantum dot including the shell layer is preferably 2 to 10 nm and more preferably 2 to 8 nm.

The present invention is more specifically described based on the examples, but the present invention is not limited to these examples.

EXAMPLES

Example 1

According to the following reaction scheme, InP/ZnP/GaP quantum dots were prepared.

Octadecene (22 mL), indium acetate (140 mg) and palmitic acid (369 mg) were added to a 200 ml three-neck flask in a glove box filled with dry nitrogen, and vacuum degassing was performed at 130° C. for 30 minutes. As 1-octadecene used in this experiment, 1-octadecene which was distilled under reduced pressure from calcium hydride and of which a moisture content calculated by the Karl Fischer method was 6 ppm was used. The reaction vessel was heated to 300° C., 4 ml of a solution (P(TMS)$_3$, concentration: 45 mM) obtained by dissolving tris(trimethylsilyl) phosphine [P(TMS)$_3$] in octadecene [ODE] was quickly added. After the addition, the mixture was allowed to cool to 230° C. over 50 minutes and reacted at 230° C. for two hours to obtain a dispersion liquid of the InP particles. The dispersion liquid was sampled and the particle diameter was measured by using a high resolution transmission electron microscope (HR-TEM), and as a result, the average particle diameter of the InP particles was 3 nm. Subsequently, after being allowed to cool to 200° C., 7.5 mL of a zinc solution (a solution obtained by vacuum degassing a mixture of zinc acetate (66 mg), palmitic acid (185 mg), and octadecene (15 ml) at 130° C. for 30 min [in Scheme: represented by Zn(C$_{15}$H$_{31}$CO$_2$)$_2$]) was added, and the mixture was allowed to react at 200° C. for 15 minutes so as to introduce Zn into the surface layer of the InP particle. Subsequently, 4.3 mL of a gallium solution (a solution obtained by heating a mixture of gallium chloride (19 mg), oleic acid (119 µl), and octadecene (5 ml) at 90° C. for one hour [in scheme represented by Ga(C$_{17}$H$_{33}$CO$_2$)$_3$]) was added, and the mixture was allowed to react at 200° C. for one hour so as to introduce Ga into the surface layer of the InP particle, and the mixture was allowed to cool to room temperature. The average particle diameter of the obtained quantum dots was 4 nm. The quantum dot dispersion liquid was diluted 5-fold with toluene, and the fluorescence spectrum (F-7000 manufactured by Hitachi High-Tech Science Corporation, excitation wavelength: 450 nm) was measured so as to measure the emission maximum, the half-width of the emission peak, and the quantum yield. Results thereof are as presented in Table 1 below.

Comparative Example 1

According to the following reaction scheme, In(Zn)P/GaP quantum dots were prepared.

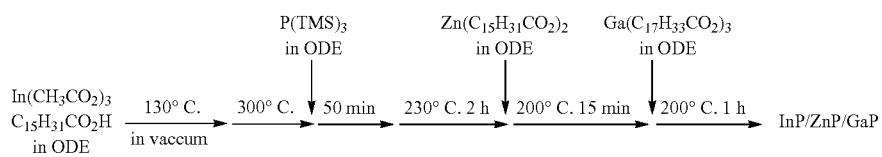

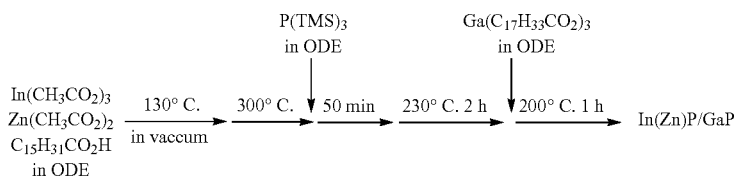

Octadecene (20 mL), indium acetate (88 mg), zinc acetate (28 mg), and palmitic acid (308 mg) were added to a 200 ml three-neck flask in a glove box filled with dry nitrogen, and vacuum degassing was performed at 130° C. for 30 minutes. As 1-octadecene used in this experiment, 1-octadecene which was distilled under reduced pressure from calcium hydride and to have 6 ppm of a moisture content calculated by the Karl Fischer method was used. The reaction vessel was heated to 300° C., 4 ml of a solution (P(TMS)$_3$, concentration: 45 mM) obtained by dissolving tris(trimethylsilyl) phosphine [P(TMS)$_3$] in octadecene [ODE, noncoordination solvent] was quickly added. After the addition, the mixture was allowed to cool to 230° C. over 50 minutes and reacted at 230° C. for two hours to obtain a dispersion liquid of the In(Zn)P particles. The dispersion liquid was sampled and the particle diameter was measured by using a high resolution transmission electron microscope (HR-TEM), and as a result, the average particle diameter of the In(Zn)P particles was 3 nm. Subsequently, after being allowed to cool to 200° C., 4.3 mL of a gallium solution (a solution obtained by heating a mixture of gallium chloride (19 mg), oleic acid (119 µl), and octadecene (5 ml) at 90° C. for one hour [in scheme represented by Ga(C$_{17}$H$_{33}$CO$_2$)$_3$]) was added, and the mixture was allowed to react at 200° C. for one hour so as to introduce Ga into the surface layer of the In(Zn)P particle, and the mixture was allowed to cool to room temperature. The average particle diameter of the obtained quantum dots was 4 nm. The quantum dot dispersion liquid was diluted 5-fold with toluene, and the fluorescence spectrum (F-7000 manufactured by Hitachi High-Tech Science Corporation, excitation wavelength: 450 nm) was measured so as to measure the emission maximum, the half-width of the emission peak, and the quantum yield. Results thereof are as presented in Table 1 below.

Example 2

A quantum dot was obtained in the same manner as in Example 1, except that 1-octadecene having a moisture content of 23 ppm was used instead of 1-octadecene having a moisture content of 6 ppm in Example 1, and the emission maximum, the half-width of the emission peak, and the quantum yield were measured in the same manner as in Example 1. Results thereof are as presented in Table 1 below. In Example 2, the average particle diameter of the obtained quantum dots was 4 nm.

Example 3

A quantum dot was obtained in the same manner as in Example 1, except that 1-octadecene having a moisture content of 14 ppm was used instead of 1-octadecene having a moisture content of 6 ppm in Example 1, and the emission maximum, the half-width of the emission peak, and the quantum yield were measured in the same manner as in Example 1. Results thereof are as presented in Table 1 below. In Example 3, the average particle diameter of the obtained quantum dots was 4 nm.

Example 4

A quantum dot was obtained in the same manner as in Example 1, except that zinc acetate used in the zinc solution in Example 1 was changed to copper (II) acetate, and the emission maximum, the half-width of the emission peak, and the quantum yield were measured in the same manner as in Example 1. Results thereof are as presented in Table 1 below. In Example 4, the average particle diameter of the obtained quantum dots was 6 nm.

Example 5

A quantum dot was obtained in the same manner as in Example 1, except that reaction conditions after the zinc solution was added: 200° C. for 15 minutes in Example 1 was changed to 90° C. for 15 minutes, and the emission maximum, the half-width of the emission peak, and the quantum yield were measured in the same manner as in Example 1. Results thereof are as presented in Table 1 below. In Example 5, the average particle diameter of the obtained quantum dots was 4 nm.

Example 6

A quantum dot was obtained in the same manner as in Example 1, except that reaction conditions after the zinc solution was added: 200° C. for 15 minutes in Example 1 was changed to 150° C. for 15 minutes, and the emission maximum, the half-width of the emission peak, and the quantum yield were measured in the same manner as in Example 1. Results thereof are as presented in Table 1 below. In Example 6, the average particle diameter of the obtained quantum dots was 4 nm.

Example 7

A quantum dot was obtained in the same manner as in Example 1, except that diphenyl ether (coordination solvent) was used instead of 1-octadecene (coordination solvent) in Example 1, and the emission maximum, the half-width of the emission peak, and the quantum yield were measured in the same manner as in Example 1. Results thereof are as presented in Table 1 below. In Example 7, the average particle diameter of the obtained quantum dots was 5 nm.

Example 8

A quantum dot was obtained in the same manner as in Example 1, except that the reaction time for forming the InP particle in Example 1 was adjusted so that the average particle diameter of the InP particles was set to 11 nm, and the emission maximum, the half-width of the emission peak, and the quantum yield were measured in the same manner as in Example 1. Results thereof are as presented in Table 1 below. In Example 8, the average particle diameter of the obtained quantum dots was 12 nm.

Comparative Example 2

A quantum dot was obtained in the same manner as in Comparative Example 1, except that copper acetate (II) was used instead of zinc acetate in Comparative Example 1, and the emission maximum, the half-width of the emission peak, and the quantum yield were measured in the same manner as in Comparative Example 1. Results thereof are as presented in Table 1 below. In Comparative Example 2, the average particle diameter of the obtained quantum dots was 6 nm.

Comparative Example 3

A quantum dot was obtained in the same manner as in Comparative Example 1, except that diphenyl ether (coordination solvent) was used instead of 1-octadecene (coordination solvent) in Comparative Example 1, and the emission maximum, the half-width of the emission peak, and the quantum yield were measured in the same manner as in Comparative Example 1. Results thereof are as presented in Table 1 below. In Comparative Example 3, the average particle diameter of the obtained quantum dots was 4 nm.

Example 9

A ZnS shell layer was further formed on the quantum dot obtained in Example 1. More specifically, in Example 1, a gallium solution was added and reacted at 200° C. for one hour and heated to 240° C., 10 mL of a mixture of a zinc solution (a solution obtained by vacuum degassing a mixture of zinc acetate (66 mg), palmitic acid (185 mg), and octadecene (15 ml) at 130° C. for 30 minutes) and 182 mg of 1-dodecanethiol was added, and the mixture was reacted at 240° C. for six hours and allowed to cool to room temperature. The quantum dot dispersion liquid was diluted 5-fold with toluene, and the emission maximum, the half-width of the emission peak, and the quantum yield were measured in the same manner as in Example 1. Results thereof are as presented in Table 1 below. In Example 9, the average particle diameter of the obtained quantum dots including shell layers was 5 nm.

TABLE 1

| | Emission maximum (nm) | Half-width (nm) | Quantum yield (%) |
|---|---|---|---|
| Example 1 | 576 | 43 | 45 |
| Example 2 | 575 | 64 | 21 |
| Example 3 | 573 | 53 | 33 |
| Example 4 | 631 | 75 | 36 |
| Example 5 | 584 | 44 | — |
| Example 6 | 577 | 46 | 26 |
| Example 7 | 580 | 45 | 46 |
| Example 8 | 575 | 51 | 40 |
| Example 9 | 551 | 47 | 83 |
| Comparative Example 1 (comparative example corresponding to Example 1) | 575 | 64 | 21 |
| Comparative Example 2 (comparative example corresponding to Example 4) | 640 | 122 | 31 |
| Comparative Example 3 (comparative example corresponding to Example 7) | 577 | 81 | 12 |

"—": not measured

As presented in Table 1 above, in the case where Zn was doped in the preparation of the InP particles (Comparative Example 1, in a case where In(Zn)P was used as nanoparticles), compared to the case (Example 1) where Zn was introduced into the surface layer after the InP particle was formed without doping Zn in the preparation of InP particles, the half-width of the emission peak was widened, so as to exhibit broad light emission characteristics. The quantum yield of Comparative Example 1 was resulted in being reduced to a half or less as compared with that of Example 1.

This tendency was recognized regardless of the type of solvent (comparison between Comparative Example 3 and Example 7).

In the case where Cu was doped in the preparation of the InP particles (Comparative Example 2, in a case where In(Cu)P was used as nanoparticles), compared to the case (Example 4) where Cu was introduced into the surface layer after the InP particle was formed without doping Cu in the preparation of InP particles, the half-width of the emission peak was widened, so as to exhibit broad light emission characteristics, as a result. It was understood that the quantum yield of Comparative Example 2 was reduced compared with that of Example 4.

From the comparison of Example 1 with Examples 2 to 7 in Table 1, it is understood that in a case where the moisture content of the solvent increases, the half-width of the emission peak is widened, and the quantum yield also tends to decrease (Examples 2 and 3), that the emission peak wavelength varies depending on the type of the metal a1 (Example 4), that in a case where the reaction temperature in the step (A1) is decreased, the half-width is slightly widened, and the quantum yield tends to decrease (Examples 5 and 6), and that in a case where a coordination solvent is used as a solvent, the half-width and the quantum yield are slightly decreased (Example 7). However, in each of these examples, in comparison with the case where those (In(Zn)P or In(Cu)P) doped with impurity atoms as the nanoparticles used in the step (A1) are used, all of the examples exhibit sharper emission peaks and exhibit the excellent quantum yield.

The present invention has been described with the embodiments thereof, any details of the description of the present invention are not limited unless described otherwise, and it is obvious that the present invention is widely construed without departing from the spirit and gist of the present invention disclosed in the accompanying claims.

What is claimed is:

1. A method of manufacturing a semiconductor quantum dot comprising the following steps (A1) and (B1):

a step (A1) of causing a salt of at least one metal a1 selected from a metal group [a] below and at least one of anion precursors selected from a sulfur-containing compound, a sulfur atom, a nitrogen-containing compound, and a phosphorus-containing compound to react with each other on a surface layer of a nanoparticle including at least one compound semiconductor selected from PbS, PbSe, InN, InAs, InSb, and InP to introduce the metal a1 into a surface layer of the nanoparticle; and a step (B1) of causing a salt of at least one metal b1 selected from a metal group [b] below and at least one of anion precursors selected from a sulfur-containing compound, a sulfur atom, a nitrogen-containing compound, and a phosphorus-containing compound to react with each other on a surface layer of the nanoparticle in which the metal a1 is introduced into the surface layer to introduce the metal b1 into the surface layer of the nanoparticle, the metal group [a]:

Ca, Sc, Ti, V, Cr, Mn, Fe, Co, Ni, Cu, and Zn, and the metal group [b]:

Ga and Ge.

2. The method of manufacturing a semiconductor quantum dot according to claim 1,
wherein an average particle diameter of nanoparticles including at least one compound semiconductor selected from PbS, PbSe, InN, InAs, InSb, and InP used in the step (A1) is 1 to 10 nm.

3. The method of manufacturing a semiconductor quantum dot according to claim 1,
wherein a reaction temperature in the step (A1) is 100° C. or higher.

4. The method of manufacturing a semiconductor quantum dot according to claim 1,
wherein a reaction temperature in the step (B1) is 100° C. or higher.

5. The method of manufacturing a semiconductor quantum dot according to claim 1,
wherein the reaction in the steps (A1) and (B1) is performed in a noncoordination solvent.

6. The method of manufacturing a semiconductor quantum dot according to claim 5,
wherein a moisture content of the solvent is 10 ppm or less.

7. The method of manufacturing a semiconductor quantum dot according to claim 1,
wherein each reaction in the steps (A1) and (B1) is performed in the presence of a coordination compound.

8. The method of manufacturing a semiconductor quantum dot according to claim 1,
wherein the metal a1 is Zn, and the metal b1 is Ga.

9. The method of manufacturing a semiconductor quantum dot according to claim 1,
wherein the nanoparticle used in the step (A1) is InP.

10. The method of manufacturing a semiconductor quantum dot according to claim 1, further comprising:
a step of forming a shell layer on a surface layer of the nanoparticle which is obtained in the step (B1) and in which the metal b1 is introduced into the surface layer.

11. The method of manufacturing a semiconductor quantum dot according to claim 10,
wherein the shell layer is ZnS, ZnO, ZnSe, $ZnSe_XS_{1-X}$, ZnTe, or CuO, where, $0<X<1$.

12. A semiconductor quantum dot having a structure in which at least one of reaction products selected from a reaction product of at least one metal a1 selected from a metal group [a] below with at least one of anion precursors selected from a sulfur-containing compound, a sulfur atom, a nitrogen-containing compound, and a phosphorus-containing compound, and a reaction product of at least one metal b1 selected from a metal group [b] below with at least one of anion precursors selected from a sulfur-containing compound, a sulfur atom, a nitrogen-containing compound, and a phosphorus-containing compound is introduced into a surface layer of a nanoparticle including at least one compound semiconductor selected from PbS, PbSe, InN, InAs, InSb, and InP, the metal group [a]:

Ca, Sc, Ti, V, Cr, Mn, Fe, Co, Ni, Cu, and Zn, and the metal group [b]:

Ga and Ge.

13. The semiconductor quantum dot according to claim 12, comprising:
a shell layer on the surface layer into which at least one of the metal a1 and the metal b1 is introduced.

14. The semiconductor quantum dot according to claim 13,
wherein the shell layer is ZnS, ZnO, ZnSe, $ZnSe_XS_{1-X}$, ZnTe, or CuO, where, $0<X<1$.

* * * * *